June 1, 1943.  M. GELFAND  2,320,517
PHOTOGRAPHIC FILM
Filed June 12, 1940
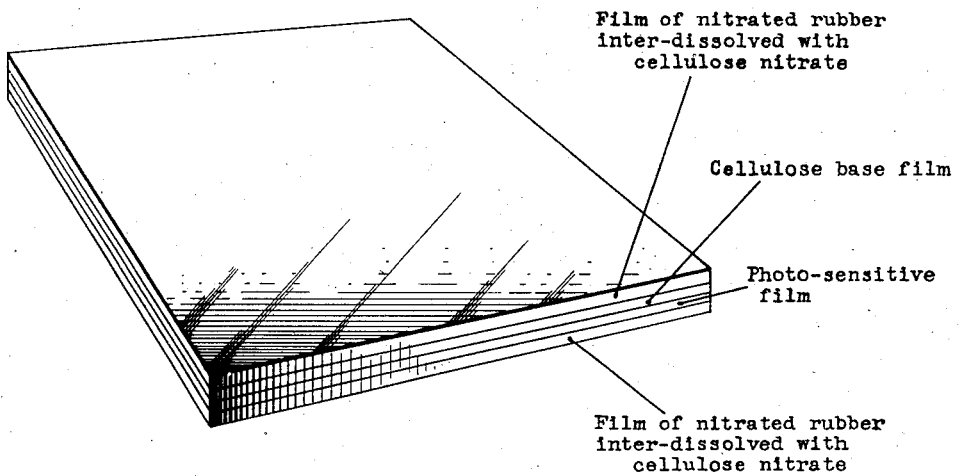
Inventor
Max Gelfand Patented June 1, 1943

2,320,517

UNITED STATES PATENT OFFICE 2,320,517

PHOTOGRAPHIC FILM

Max Gelfand, Dallas, Tex.

Application June 12, 1940, Serial No. 340,178

6 Claims. (Cl. 88—19.5)

This invention pertains to improvements in photographic film to transmit light or sound.

For illustration, this invention may be described with reference to moving picture film bearing an emulsion for projection of pictures and also a sound track to control the transmission of light for projection of sound. Such film becomes impaired by abrasion of the emulsioned surface as the film is wound through projection machines. Such films also deteriorate under influence of light and heat in the machine where concentration of light and of heat by lenses upon the film in confined space is intense. Not only do this intense light and heat promote a tendency for the emulsion to become altered but combine with continued and repeated flexing of the film to impair the flexibility of it.

Various proposals have been made to coat films but the requirements in modern practice are severe. The coating must not dissolve the emulsion nor the film else the photographic qualities of the light or sound areas are altered. As the film dissolves its flexibility is dimensioned and the film tends to break in use. Many coatings actually diminish the life of the film as well as impair its usefulness. Some coatings that have been proposed are themselves brittle. Some coatings that have been proposed fail to adhere well to the emulsion or film and in consequence under repeated flexing of the film with reeling or unreeling, and under the intense light and heat of customary use, soon crack or even peel from the film. Whether this is due to low elasticity or to inability to expand and contract properly is not entirely clear.

An object of this invention is to provide a film that is resistant against abrasion and that is of relatively long life in projection machines. A particular object further is to provide a film that resists intense heat and neither cracks nor breaks readily in use and one that is resistant also to the ravages of moisture in the air when the film must be exposed in humid atmospheres. A further object is to secure a coating that will not readily peel or check from the film. Also a purpose of this invention is to coat the sound track of a film so as not to distort the sound effect from the film. Also an object of the invention is to provide a composition that is relatively stable in storage but one that may be applied to film in relatively simple manner with satisfactory results. A further purpose is to provide a composition for coating film that permits of some latitude of proportions and yet may be applied smoothly and quickly. Also, a purpose is to afford a composition for coating films of cellulose esters or ethers and the like that is tenacious and yet not weaken the film nor impair the film properties. Such a composition must be capable of drying quickly but without imparting "bloom" to the surface.

These and other objects will be apparent in the following illustrative description of a preferred practice of this invention. However, the invention is not restricted to these specific illustrations and may be practiced in other forms within the general principles of this disclosure.

In the drawing which accompanies and forms a part of the following specification, the sole figure is a perspective view of a piece of photographic film in which the basic film with light sensitive coating is shown provided on both sides with the protective coating of the subject invention.

In accordance with this invention various objects are attained by applying nitrated rubber as a coating to the film. Preferably, this is applied in solvent that is also solvent for cellulose esters. In a preferred specific application of this invention nitrated rubber is applied as a coating in combination with cellulose nitrate dissolved in a common solvent for the two that is also effective as a drier and combined with material that serves to reduce "blooming" of the applied coating.

The nitrated rubber may be dissolved in acetone and applied to the film but it is preferable to dissolve in the acetone an amount of cellulose nitrate. This common solvent is effective for rapid drying of the film. Such solvent also is ethyl ether, or preferably a mixture of ethyl ether with acetone. Intermixed in this solution may be an amount of amylacetate or of ethyl alcohol but preferably a mixture of amylacetate and ethyl alcohol. These later are termed herein "anti-blooming" agents, for they serve to control the drying of this particular solution so that the opaque surface appearance often known as "bloom" may be avoided. It may be that "bloom" is caused by condensation of moisture at the evaporative surface where film is being formed from solution.

In preparation of this coating, nitrated rubber may be dissolved in a mixture of amylacetate and acetone proportioned about 3 to 5. About 1 part by weight of nitrated rubber is dissolved in about 100 parts by weight of this mixed solvent. This is a proportion of about 8 grams of the nitrated rubber in 800 cc. of the solvent. But proportions as low as about 5 grams of the nitrated gum to as high as about 10 grams of nitrated rubber may be dissolved in this amount of solvent. Also, pyroxylin or cellulose nitrate as an example of cellulose ester may be dissolved in ether and alcohol proportioned about 3 to 1. About 4 parts by weight of pyroxylin preferably are dissolved in 100 parts of this mixed solvent. It is also desirable to dissolve about 2 parts by weight of camphor in this mixed solvent of ether and alcohol. These solutions of nitrated rubber and collodion in their respective solvents then are intermixed to form the composition of this invention. As the proportions of alcohol-ether mixture in the solvent are increased relatively to the amylacetate-acetone, the film coating will tend to "bloom." From this mixture a film of nitrated rubber intermixed with cellulose nitrate may be deposited. Ether and acetone represent mutual solvents that evaporate quickly and may be termed driers. The solution also contains solvents that may be termed anti-blooming agents such as ethyl alcohol and amylacetate. Best results are obtained from a specific mixture in which cellulose nitrate and nitrated rubber are mutually dissolved in a specific solvent of ethyl ether and acetone with ethyl alcohol and amylacetate. This combination is further improved and toughened by the presence of camphor, which also is dissolved in the particular mixed solvent described.

Nitrated rubber suitable for this invention may be prepared in various ways but it is sufficient to treat pure gum rubber with concentrated nitric acid in proportions of about 60 grams of pure gum rubber to about 100 cubic centimeters of nitric acid. This mixture is warmed gently until the reaction starts and until the rubber has gone into solution, and then is cooled. To the cooled solution distilled water is added carefully until all the nitrated rubber is precipitated. This precipitate is separated by filtration, is washed with distilled water until the washings are neutral to litmus indicator, and then is dried carefully at about 100° C.

This solution may be applied by running a film through the solution and then upwardly at an angle suitable for drainage such as about 60°. The film then may be drawn horizontally to afford opportunity for the coating to dry smoothly and uniformly. This drying occurs in about fifteen minutes under ordinary conditions.

The solution itself is of slightly yellowish tone but when applied to a film appears not to detract from the photographic or from the sound qualities of the film. The sound track depends on the transmission of light, so improper color tone or irregular thicknesses or blooming of the coating would tend to distort sound that is reproduced from the track. However, this present coating maintains excellent quality of sound and of picture transmission and yet provides an extremely tough resistant film. The film is markedly superior to untreated film when run through a projector repeatedly and withstands the action of an arc light type projector as well as a bulb type.

Films of cellulose nitrate treated with this coating show not only long life of film and marked resistance to abrasion in commercial projecting machines but also show enhanced resistance to fire. The coating is tenaciously adherent without impairing the strength of cellulose nitrate films. The coating is useful also with cellulose acetate and other films.

Where camphor or camphoraceous material is referred to in the description and claims, it is intended to include substances not necessarily of natural origin but comprising synthetic products frequently classed with camphor by those skilled in the art.

While in accordance with the patent statutes, I have described a preferred embodiment of this invention, it will now be apparent to those skilled in the art that alterations and modifications may be made within the scope of the appended claims.

What I claim is:

1. A photographic film having a developed photographic image coated with an adherent coating of nitrated rubber in admixture with cellulose acetate.

2. A photographic film comprising a sound track covered with a coating of nitrated rubber interdissolved with cellulose nitrate.

3. A photographic film comprising a sound track and a developed photographic image both covered with a coating of nitrated rubber interdissolved with cellulose nitrate and camphoraceous material.

4. A photographic film having a developed photographic image and a sound track provided with a protective coating composition resulting from intersolution of nitrated rubber and cellulose nitrate in a common solvent therefor.

5. A photographic film having a developed photographic image and a sound track both provided with a protective coating composition resulting from intersolution of nitrated rubber, cellulose nitrate and camphoraceous material in a common solvent therefor.

6. A photographic film having a developed photographic image and a sound track both provided with a protective coating composition resulting from intersolution of nitrated rubber, cellulose nitrate and camphoraceous material in amylacetate.

MAX GELFAND.